(12) United States Patent
Bunsen

(10) Patent No.: US 11,228,207 B2
(45) Date of Patent: Jan. 18, 2022

(54) POWER RECEIVING DEVICE, CONTROL METHOD THEREOF, AND FEED SYSTEM

(71) Applicant: Sony Group Corporation, Tokyo (JP)

(72) Inventor: Keigo Bunsen, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 1036 days.

(21) Appl. No.: 15/124,348

(22) PCT Filed: Mar. 5, 2015

(86) PCT No.: PCT/JP2015/056462
§ 371 (c)(1),
(2) Date: Sep. 7, 2016

(87) PCT Pub. No.: WO2015/151709
PCT Pub. Date: Oct. 8, 2015

(65) Prior Publication Data
US 2017/0033608 A1  Feb. 2, 2017

(30) Foreign Application Priority Data

Apr. 2, 2014  (JP) .............................. JP2014-076153

(51) Int. Cl.
*H02J 50/12* (2016.01)
*H02J 50/90* (2016.01)
*H02J 7/02* (2016.01)
*H02J 50/80* (2016.01)

(52) U.S. Cl.
CPC .............. *H02J 50/12* (2016.02); *H02J 7/025* (2013.01); *H02J 50/80* (2016.02)

(58) Field of Classification Search
USPC ......................................................... 307/104
See application file for complete search history.

(56) References Cited

U.S. PATENT DOCUMENTS

| | | | |
|---|---|---|---|
| 9,595,838 B2* | 3/2017 | Tanabe ................... | H02J 7/025 |
| 10,369,369 B2* | 8/2019 | Perryman ............ | A61N 1/3752 |
| 2008/0224661 A1* | 9/2008 | Onose ................... | H02J 7/0027 |
| | | | 320/115 |
| 2009/0206791 A1* | 8/2009 | Jung ....................... | H02J 50/10 |
| | | | 320/108 |
| 2010/0181961 A1* | 7/2010 | Novak ................... | H02J 50/40 |
| | | | 320/108 |
| 2012/0309306 A1* | 12/2012 | Kim ..................... | H04B 5/0031 |
| | | | 455/41.1 |

(Continued)

FOREIGN PATENT DOCUMENTS

| | | |
|---|---|---|
| JP | 2011-509067 A | 3/2011 |
| JP | 2013-172641 A | 9/2013 |

(Continued)

*Primary Examiner* — Toan T Vu
*Assistant Examiner* — Xuan Ly
(74) *Attorney, Agent, or Firm* — Michael Best & Friedrich LLP

(57) ABSTRACT

A power receiving device of the present disclosure includes a power generating unit and a control unit. The power generating unit generates direct-current power, on a basis of a power signal supplied from a power feeding device wirelessly. The control unit sets, on a basis of an output current of the power generating unit, an upper limit of the output current or an upper limit of output power of the power generating unit.

17 Claims, 16 Drawing Sheets

(56) References Cited

U.S. PATENT DOCUMENTS

| | | | | |
|---|---|---|---|---|
| 2013/0062965 A1* | 3/2013 | Chernokalov | .......... | H02J 50/10 |
| | | | | 307/104 |
| 2013/0214611 A1* | 8/2013 | Bae | ........................ | H02M 7/06 |
| | | | | 307/104 |
| 2013/0270922 A1* | 10/2013 | Kato | ....................... | H02J 17/00 |
| | | | | 307/104 |
| 2014/0145516 A1* | 5/2014 | Hirosawa | .............. | B60L 11/182 |
| | | | | 307/104 |
| 2015/0244176 A1* | 8/2015 | Van Den Brink | ...... | H02J 5/005 |
| | | | | 307/104 |

FOREIGN PATENT DOCUMENTS

| | | |
|---|---|---|
| JP | 2013-243853 A | 12/2013 |
| WO | 2013/046594 A1 | 4/2013 |

* cited by examiner

[ FIG. 1 ]
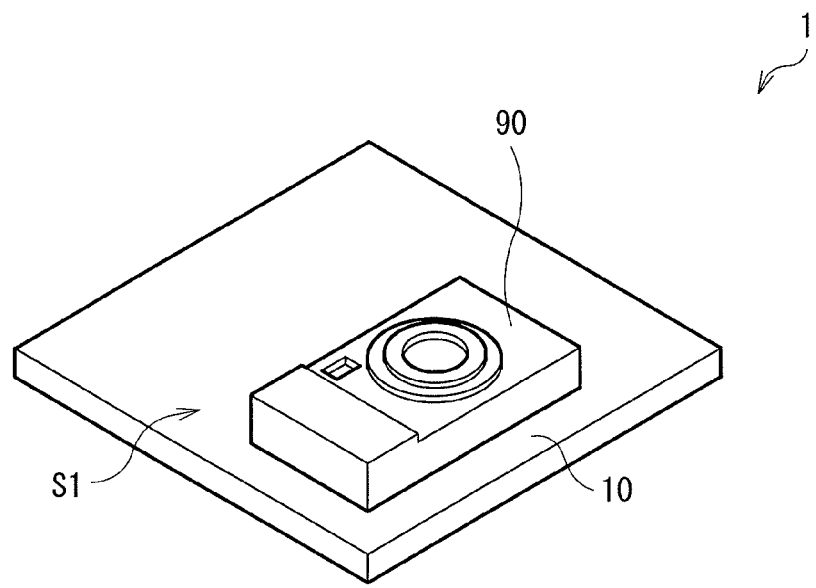
[ FIG. 2 ]
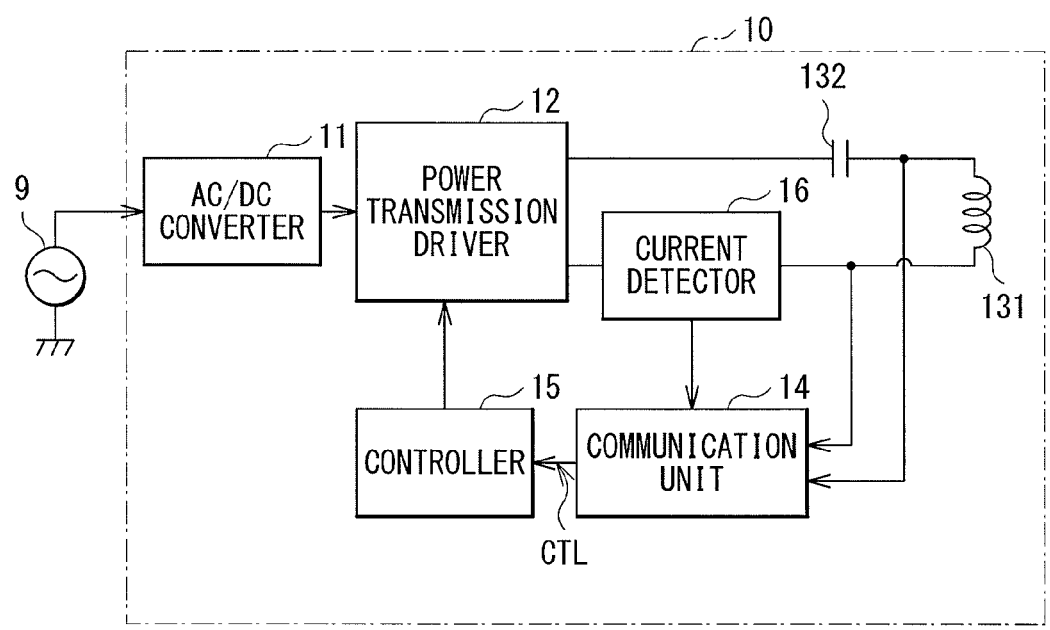

[FIG. 3]
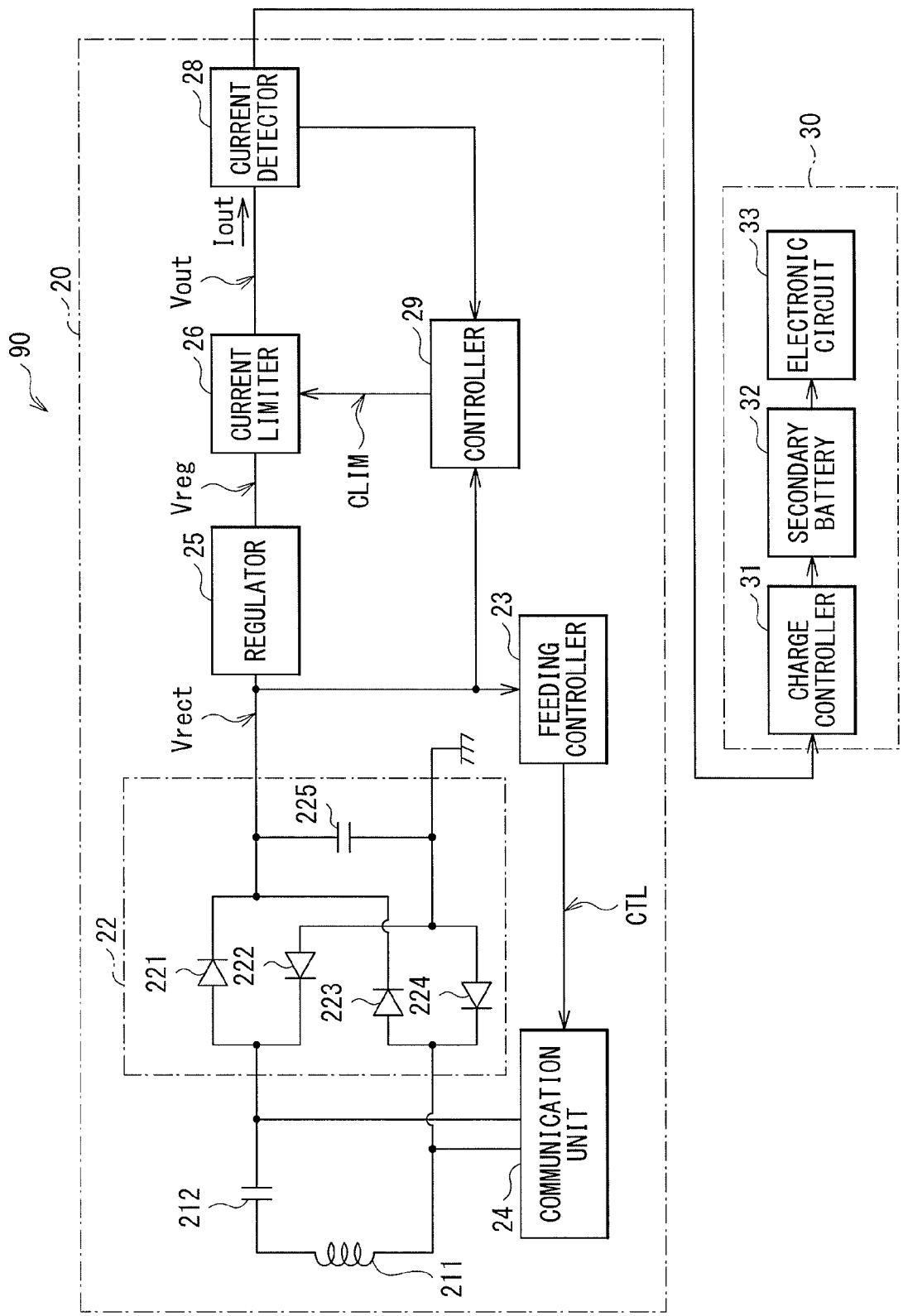

[ FIG. 4 ]
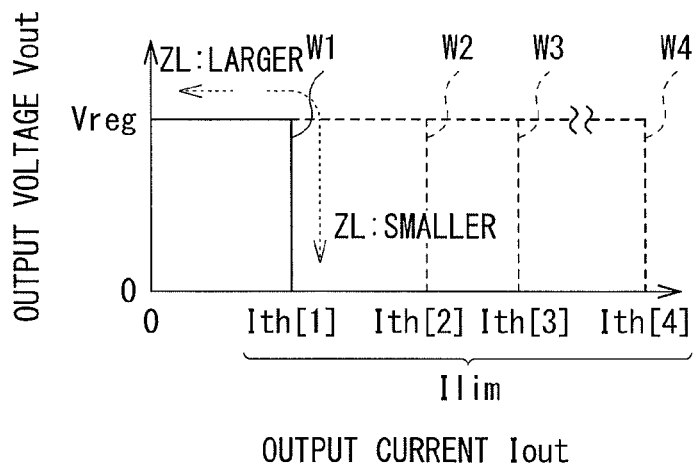
[ FIG. 5 ]
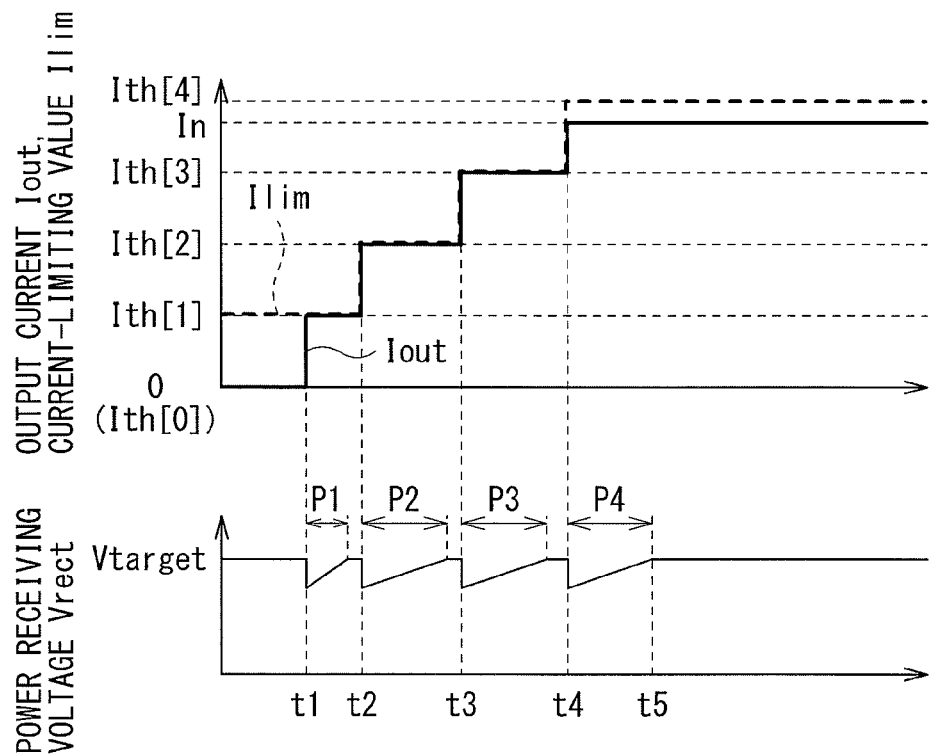

[ FIG. 6 ]
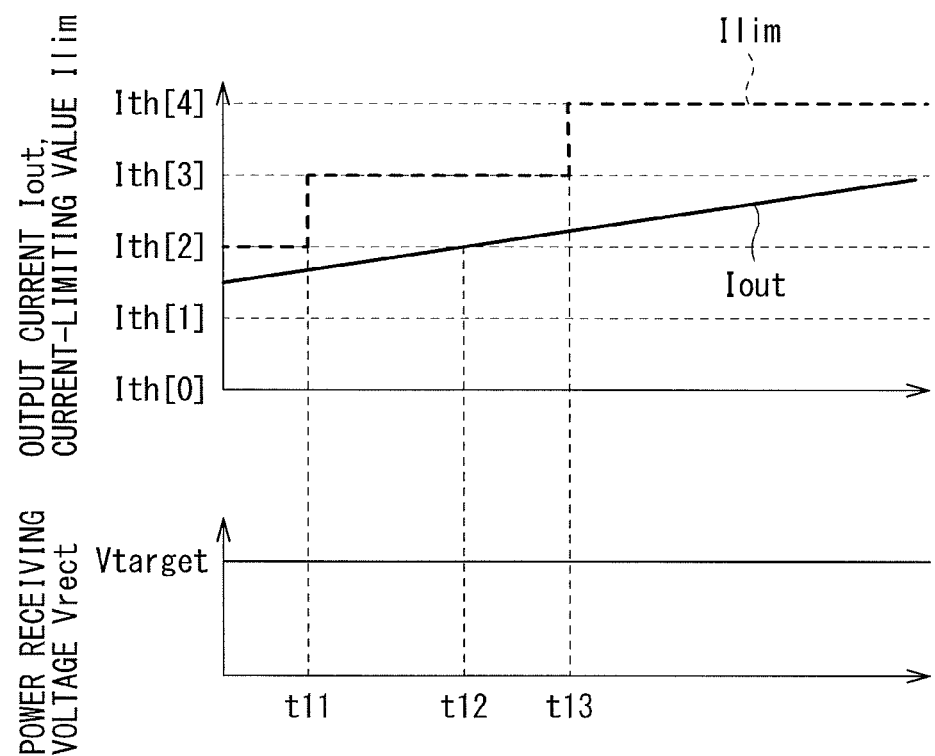

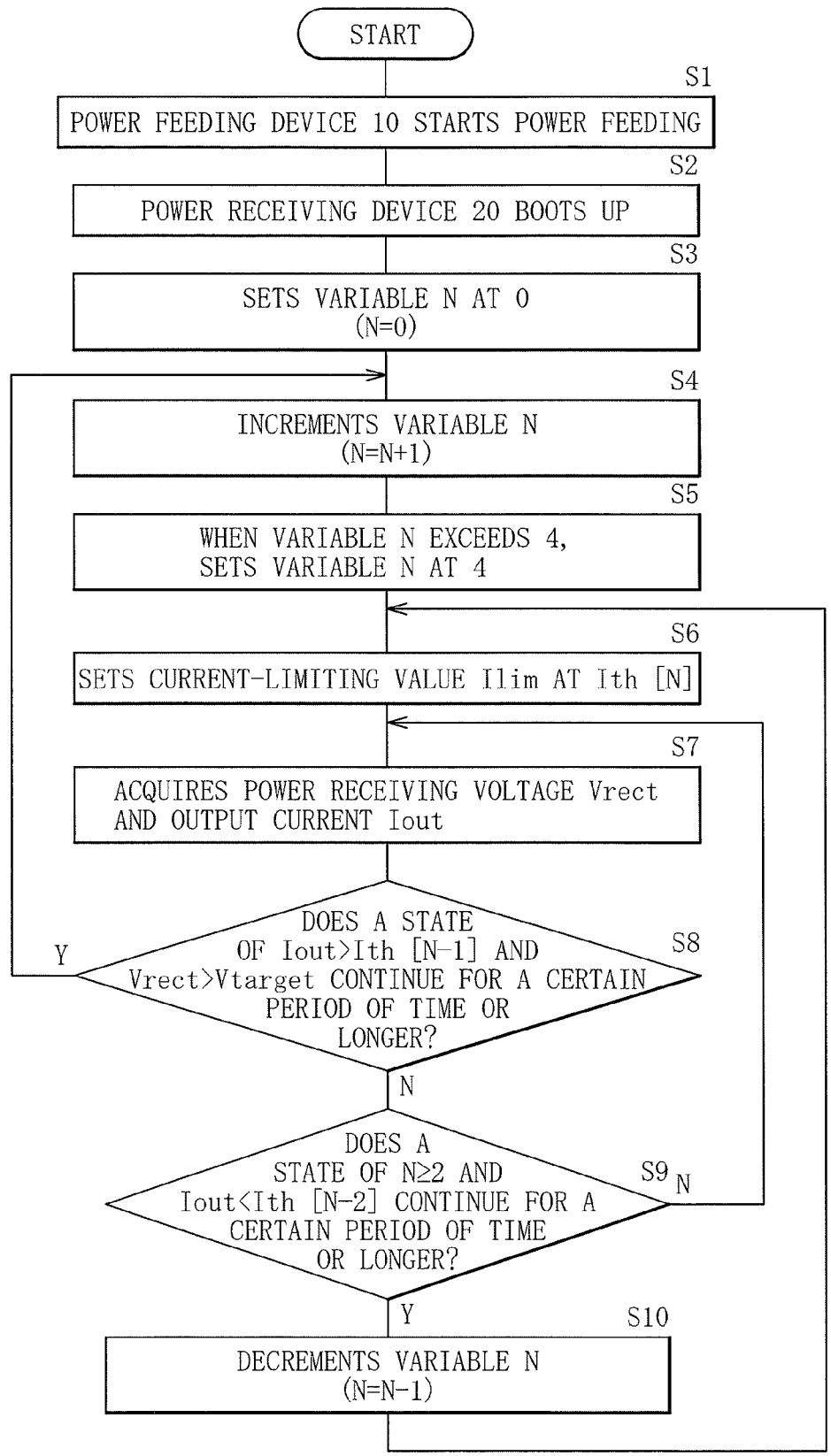
[ FIG. 7 ]

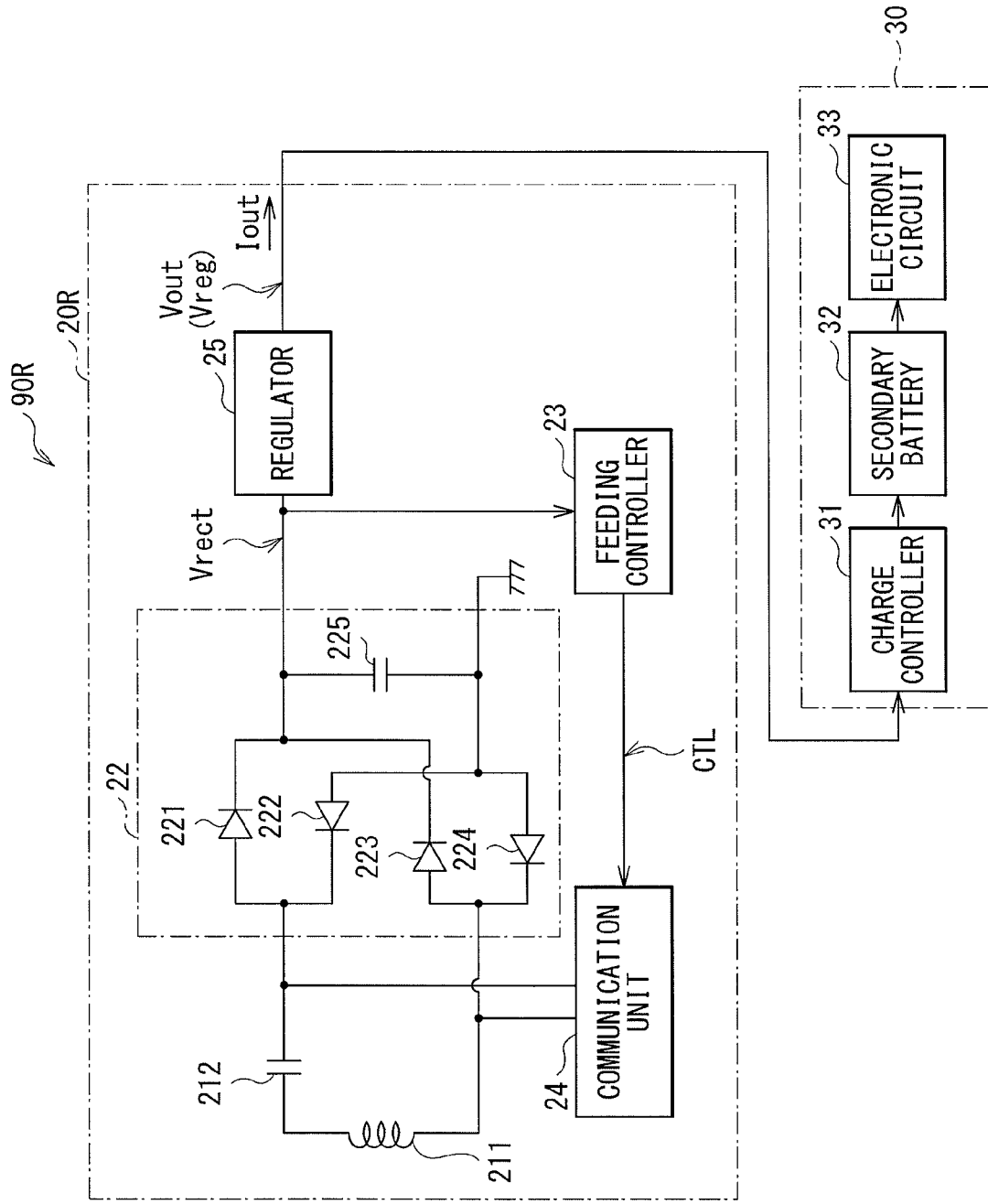
[FIG. 8]

[ FIG. 9 ]
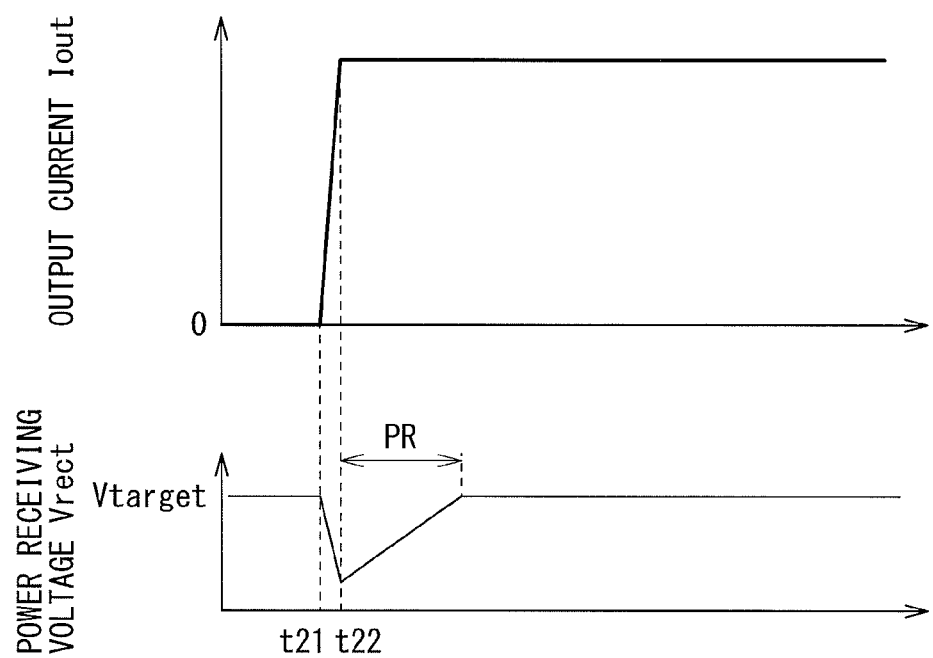

[ FIG. 10 ]
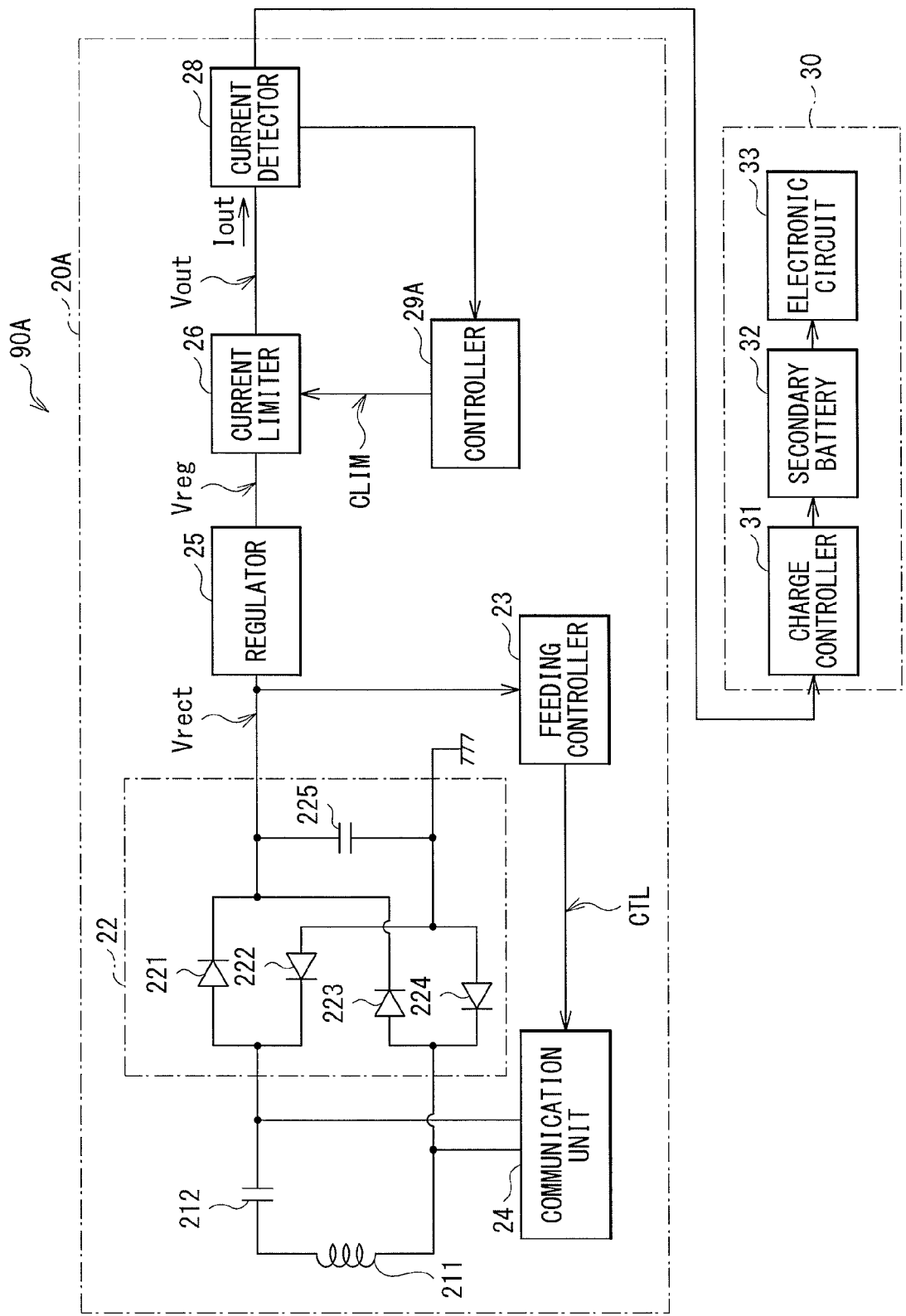

[ FIG. 11 ]
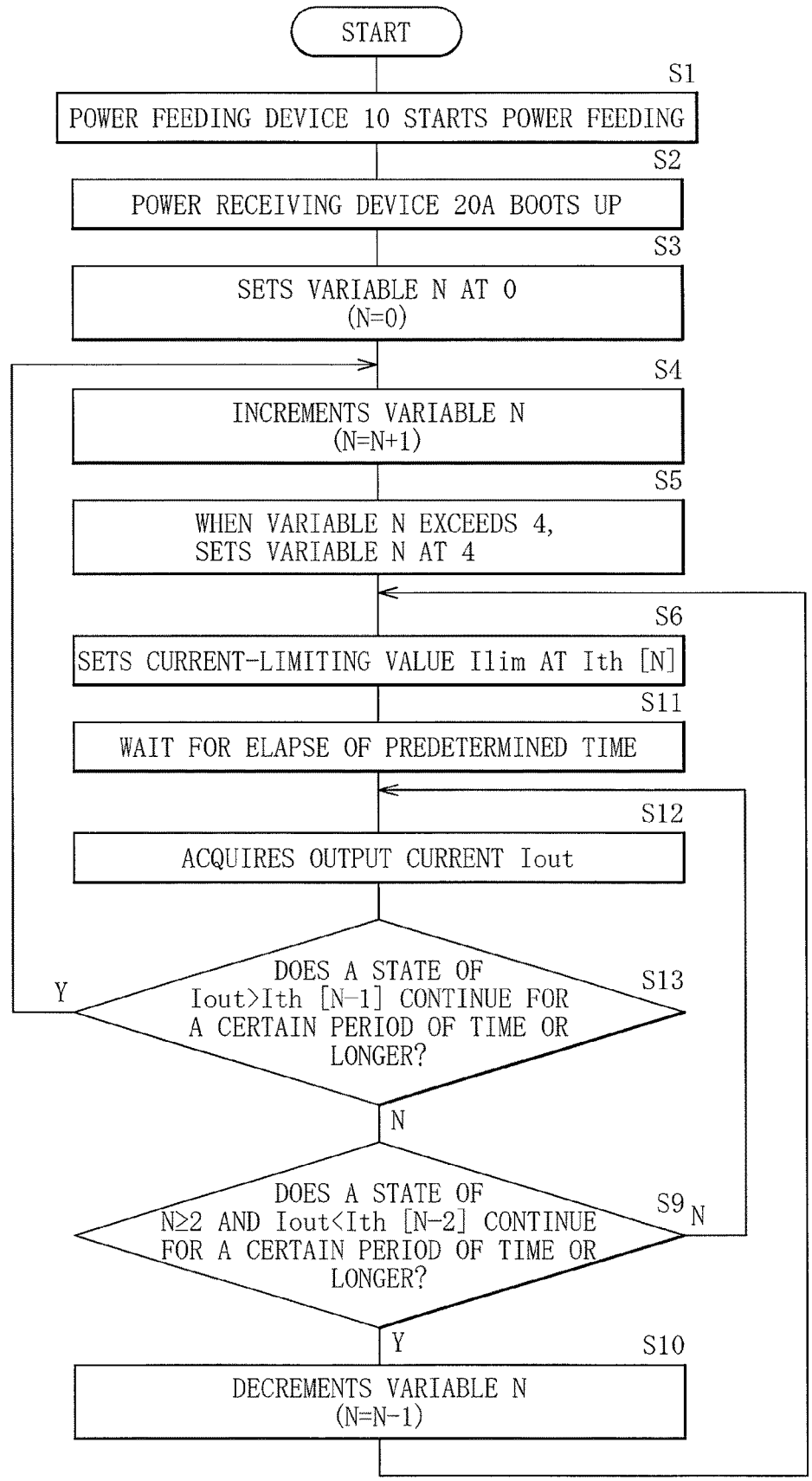

[ FIG. 12A ]
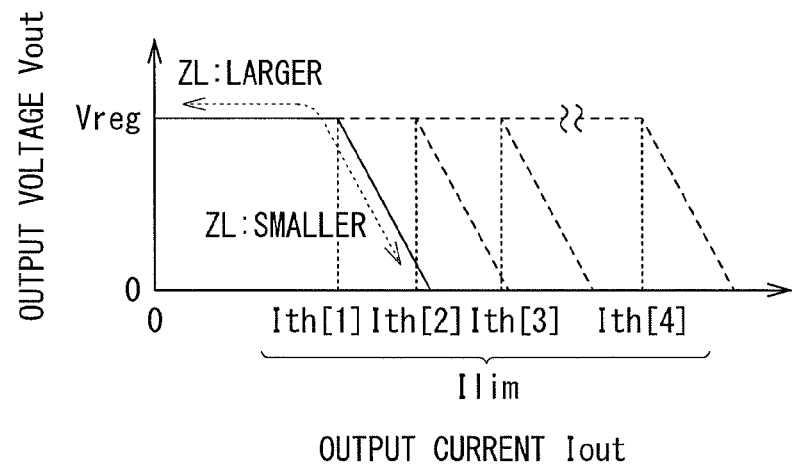
[ FIG. 12B ]
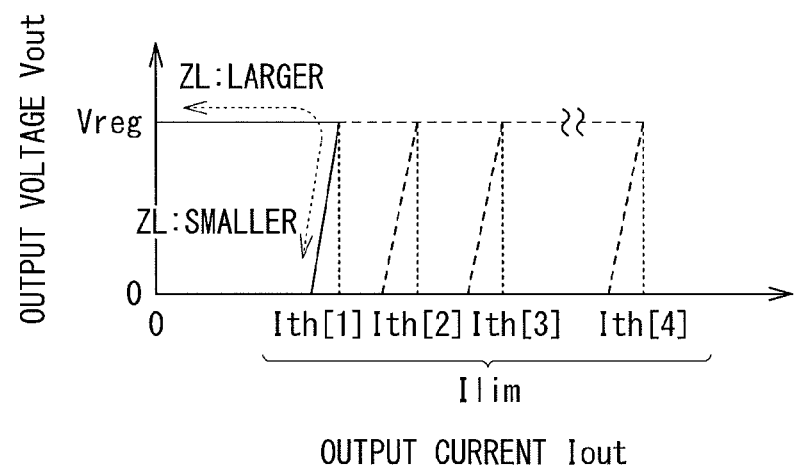

[FIG. 13]
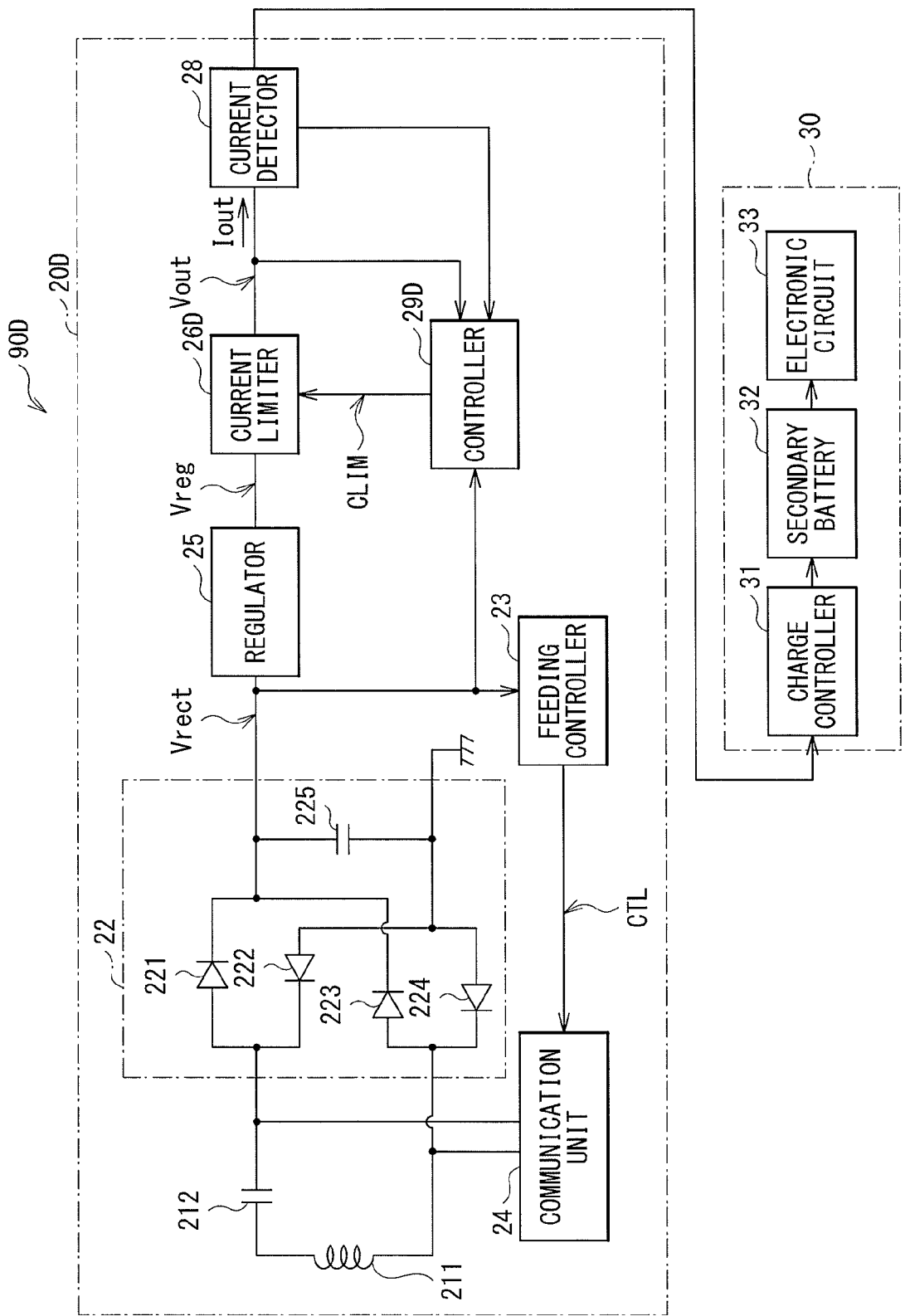

[ FIG. 14 ]
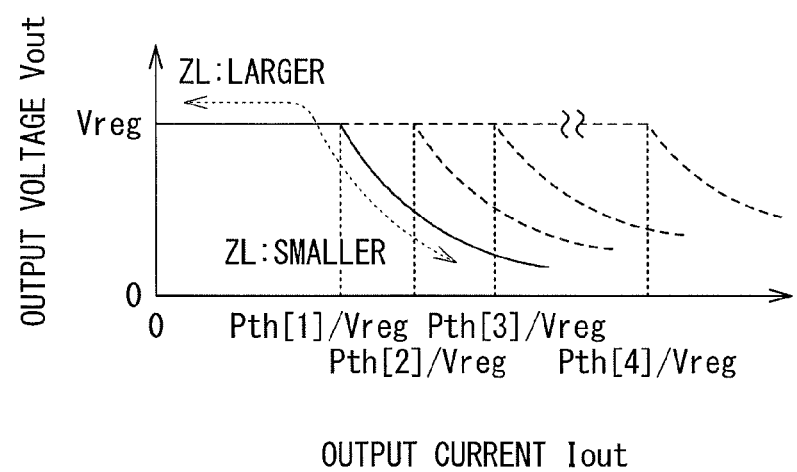

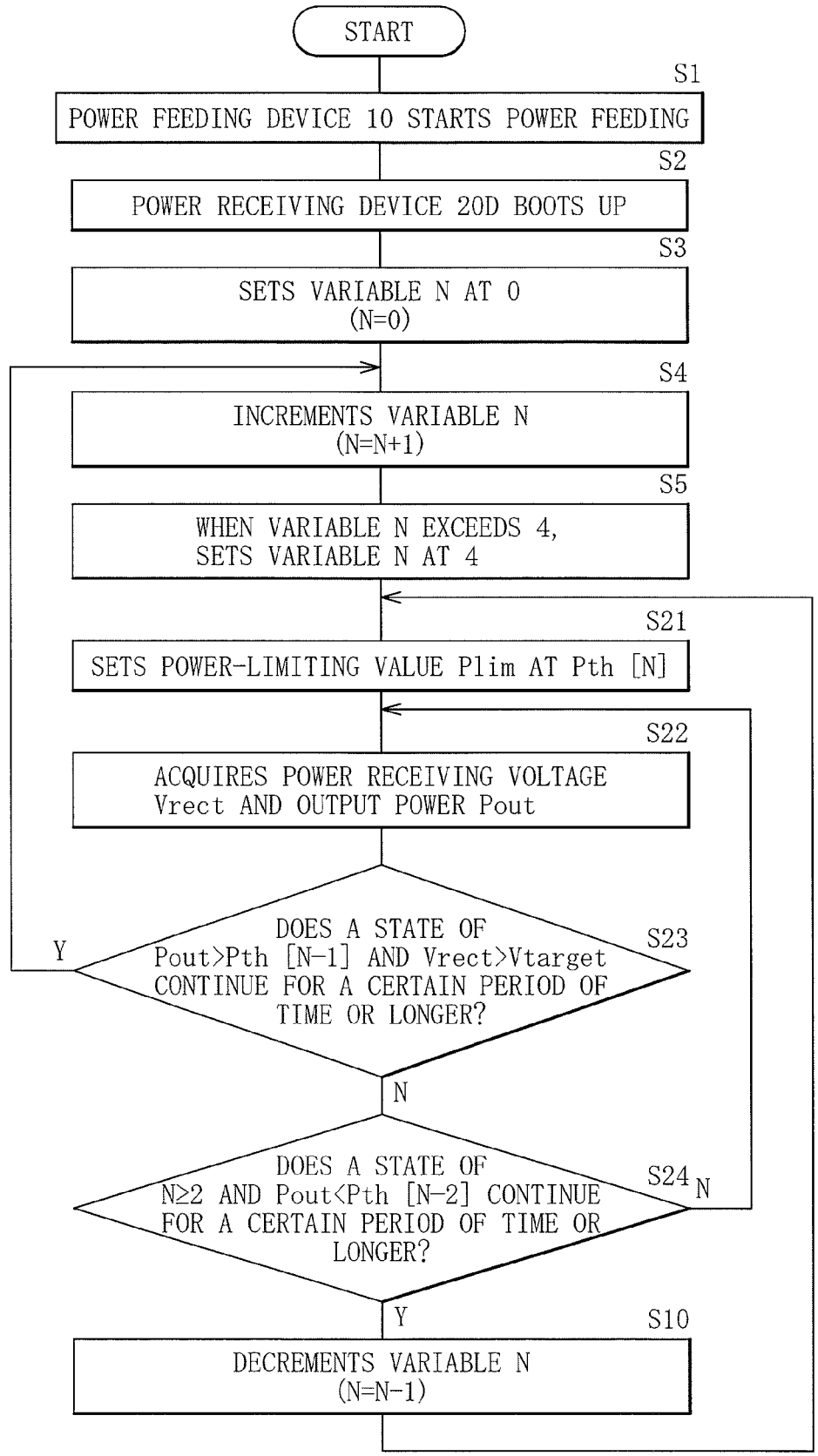
[ FIG. 15 ]

[ FIG. 16 ]
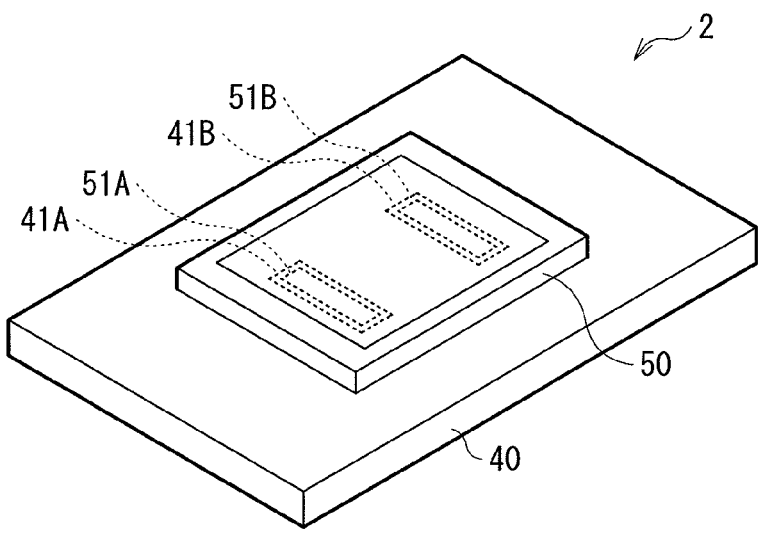
[ FIG. 17 ]
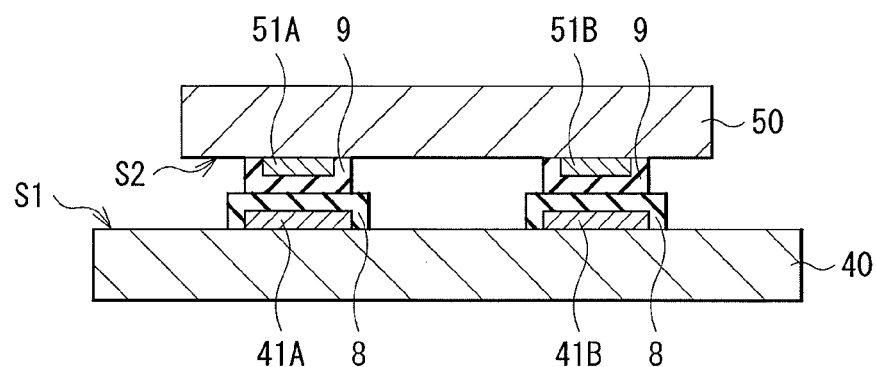

[ FIG. 18 ]
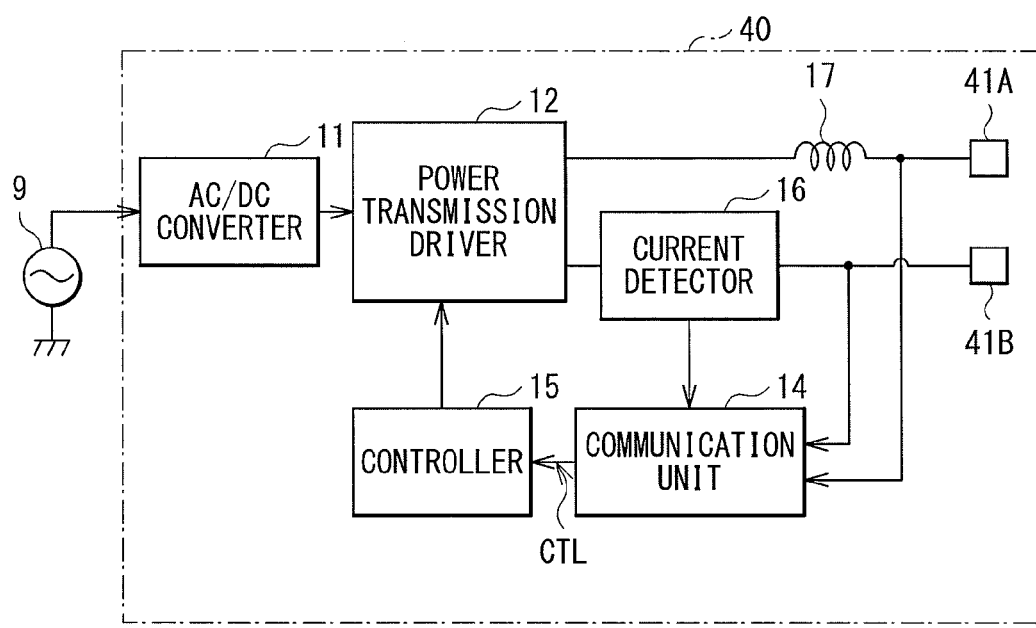

[FIG. 19]
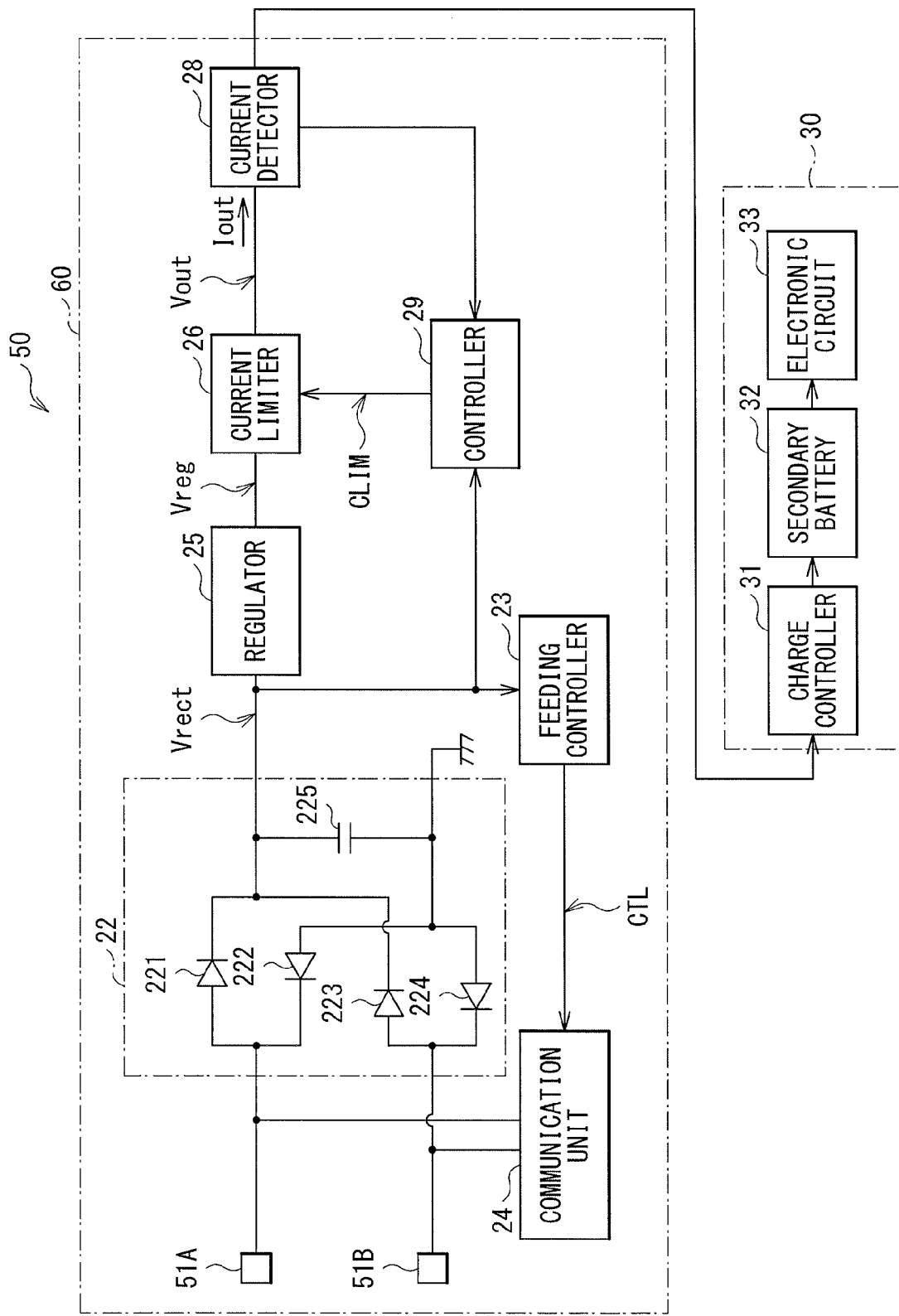

POWER RECEIVING DEVICE, CONTROL METHOD THEREOF, AND FEED SYSTEM

TECHNICAL FIELD

The present disclosure relates to a power receiving device that receives power from a power feeding device wirelessly, to a method of controlling such a power receiving device, and to a feed system using such a power receiving device.

BACKGROUND ART

In recent years, a feed system has attracted attention that performs wireless power feeding (also called wireless power transfer, contact-free or non-contact power feeding) into CE devices (Consumer Electronics devices) such as mobile phones and portable music players. In such a feed system, for example, a mobile phone may be charged by placing the mobile phone (power receiving device) on a power feeding tray (power feeding device). Examples of methods of performing such wireless power feeding may include an electromagnetic induction method, a magnetic field resonance method (also called magnetic resonance method) using a resonance phenomenon, and an electric field coupling method.

In such a feed system, communication may be often performed between a power feeding device and a power receiving device to regulate feeding power. For example, in PTL 1, an induction power supply device is disclosed that controls a feeding power amount, on the basis of a feedback signal from a secondary circuit (power receiving device).

CITATION LIST

Patent Literature

Patent Literature 1: Japanese Unexamined Patent Application Publication (Translation of PCT Application) No. 2011-509067

SUMMARY OF INVENTION

Meanwhile, in a feed system, it is desired that power feeding operation is allowed to be performed stably. More specifically, for example, an electronic apparatus with a built-in power receiving device is expected to perform the power feeding operation stably, even in the event of a rapid increase in a load, such as a case of a start of charging of a secondary battery and a case of a start of processing that involves large amounts of calculation.

It is therefore desirable to provide a power receiving device, a method of controlling a power receiving device, and a feed system that make it possible to perform power feeding operation stably.

A power receiving device according to an embodiment of the present disclosure includes a power generating unit and a control unit. The power generating unit generates direct-current power, on a basis of a power signal supplied from a power feeding device wirelessly. The control unit sets, on a basis of an output current of the power generating unit, an upper limit of the output current or an upper limit of output power of the power generating unit.

A method of controlling a power receiving device according to an embodiment of the present disclosure includes: allowing a power generating unit to generate direct-current power, on a basis of a power signal supplied from a power feeding device wirelessly; and setting, on a basis of an output current of the power generating unit, an upper limit of the output current or an upper limit of output power of the power generating unit.

A feed system according to an embodiment of the present disclosure includes a power feeding device and a power receiving device. The power receiving device includes a power generating unit and a control unit. The power generating unit generates direct-current power, on a basis of a power signal supplied from the power feeding device wirelessly. The control unit sets, on a basis of an output current of the power generating unit, an upper limit of the output current or an upper limit of output power of the power generating unit.

In the power receiving device, the method of controlling the power receiving device, and the feed system according to the respective embodiments of the present disclosure, direct-current power is generated on the basis of the power signal supplied from the power feeding device wirelessly. At this time, the upper limit of the output current or the upper limit of the output power of the power generating unit is set, on the basis of the output current of the power generating unit.

According to the power receiving device, the method of controlling the power receiving device, and the feed system according to the respective embodiments of the present disclosure, the upper limit of the output current or the upper limit of the output power of the power generating unit is set, on the basis of the output current of the power generating unit. Hence, it is possible to perform power feeding operation stably. It is to be noted that some effects described here are not necessarily limitative, and any of other effects described herein may be achieved.

BRIEF DESCRIPTION OF DRAWINGS

FIG. 1 is a perspective view of an example of a configuration of a feed system according to an embodiment of the present disclosure.

FIG. 2 is a block diagram of an example of a configuration of a power feeding device illustrated in FIG. 1.

FIG. 3 is a block diagram of an example of a configuration of an electronic apparatus illustrated in FIG. 1.

FIG. 4 is an explanatory diagram that illustrates an example of characteristics of a current limiter illustrated in FIG. 3.

FIG. 5 is a timing chart that illustrates an example of operation of a power receiving device illustrated in FIG. 3.

FIG. 6 is a timing chart that illustrates another example of the operation of the power receiving device illustrated in FIG. 3.

FIG. 7 is a flowchart that illustrates an example of the operation of the power receiving device illustrated in FIG. 3.

FIG. 8 is a block diagram of an example of a configuration of an electronic apparatus according to a comparative example.

FIG. 9 is a timing chart that illustrates an example of operation of a power receiving device illustrated in FIG. 8.

FIG. 10 is a block diagram of an example of a configuration of an electronic apparatus according to a modification example.

FIG. 11 is a flowchart that illustrates an example of operation of a power receiving device illustrated in FIG. 10.

FIG. 12A is an explanatory diagram that illustrates an example of characteristics of a current limiter according to another modification example.

FIG. 12B is an explanatory diagram that illustrates an example of characteristics of a current limiter according to another modification example.

FIG. 13 is a block diagram of an example of a configuration of an electronic apparatus according to another modification example.

FIG. 14 is an explanatory diagram that illustrates an example of characteristics of a current limiter illustrated in FIG. 13.

FIG. 15 is a flowchart that illustrates an example of operation of a power receiving device illustrated in FIG. 13.

FIG. 16 is a perspective view of an example of a configuration of a feed system according to another modification example.

FIG. 17 is a cross-sectional view of a simplified cross-sectional structure of the feed system illustrated in FIG. 16.

FIG. 18 is a block diagram of an example of a configuration of a power feeding device illustrated in FIG. 16.

FIG. 19 is a block diagram of an example of a configuration of an electronic apparatus illustrated in FIG. 16.

DESCRIPTION OF EMBODIMENTS

In the following, some embodiments of the present disclosure are described in detail with reference to the drawings.

CONFIGURATION EXAMPLES

FIG. 1 illustrates an example of a configuration of a feed system according to an embodiment of the present disclosure. A feed system 1 may be a feed system that may feed power with use of electromagnetic induction. It is to be noted that a power receiving device and a method of controlling a power receiving device according to respective embodiments of the present disclosure are embodied by the present embodiment, and description thereof is made together.

The feed system 1 may include a power feeding device 10 and an electronic apparatus 90. The power feeding device 10 may be a tray-type power feeding device in this example. The power feeding device 10 may perform power feeding into a power receiving device 20 (described later) that may be incorporated in the electronic apparatus 90, by placing the electronic apparatus 90 on a power feeding surface S1 of the power feeding device 10, and charge a secondary battery 32 (described later).

A power feeding coil 131 described later may be disposed on the power feeding surface S1 (on side on which the power feeding device 10 may make contact with the electronic apparatus 90) of the power feeding device 10. A power receiving coil 211 described later may be disposed on a power receiving surface (on side on which the electronic apparatus may make contact with the power feeding device 10) of the electronic apparatus 90. The power feeding device 10 may supply power to the electronic apparatus 90 with use of the electromagnetic induction through the power feeding coil 131 and the power receiving coil 211. At this time, the power receiving device 20 of the electronic apparatus 90 may communicate with the power feeding device 10 through so-called load modulation, and give instructions on, for example, feeding power to the power feeding device 10. This makes it possible for a user to charge the secondary battery 32 without directly connecting an AC (Alternating Current) adapter or other components to the electronic apparatus 90, leading to enhancement in convenience for the user.

It is to be noted that, in this example, the electronic apparatus 90 may be a digital camera; however, this is non-limiting. For example, various portable terminal devices such as a video camera, a smartphone, a mobile battery, a tablet, an electronic book reader, and an audio player may be used. Further, in this example, the power feeding device 10 may perform the power feeding to the single electronic apparatus 90; however, this is non-limiting. Alternatively, the power feeding device 10 may perform the power feeding to the two or more electronic apparatuses 90 at the same time or on a time-division basis (sequentially).

FIG. 2 illustrates an example of a configuration of the power feeding device 10. The power feeding device 10 may include an AC/DC converter 11, a power transmission driver 12, the power feeding coil 131, a capacitor 132, a current detector 16, a communication unit 14, and a controller 15.

The AC/DC converter 11 may convert an AC power supply signal supplied from an AC power supply 9 into a DC power supply signal, and supply the resulting DC power source signal to the power transmission driver 12. It is to be noted that, in this example, the AC power supply signal may be supplied to the power feeding device 10; however, this is non-limiting. Alternatively, for example, a DC power supply signal may be supplied. In such a case, for example, the AC/DC converter 11 may be omitted.

The power transmission driver 12 may generate an AC power signal Sp1 having a square waveform, on the basis of the DC power supply signal supplied from the AC/DC converter 11, and output the generated signal as an inter-terminal signal between a first output terminal and a second output terminal. At this time, in this example, the power transmission driver 12 may change a feeding frequency fp of the power signal Sp1, on the basis of an instruction from the controller 15. It is to be noted that this is non-limiting. For example, other properties such as amplitude and a duty ratio of the power signal Sp1 may be changed on the basis of the instruction from the controller 15.

The power feeding coil 131 may establish coupling to the power receiving coil 211 (described later) of the power receiving device 20 through an electromagnetic field. A first end of the power feeding coil 131 may be coupled to the first output terminal of the power transmission driver 12 through the capacitor 132, and a second end thereof may be coupled to the second output terminal of the power transmission driver 12 through the current detector 16. In such a manner, the power feeding coil 131 and the capacitor 132 may be coupled in series to form an LC resonance circuit. The power signal Sp1 may be supplied from the power transmission driver 12 across both ends of the series-connected power feeding coil 131 and the capacitor 132, which leads to the electromagnetic field being generated by the power feeding coil 131. The power feeding device 10 may perform the power feeding into the power receiving device 20 of the electronic apparatus 90 through this electromagnetic field.

The current detector 16 may detect a current flowing through the power feeding coil 131, and a first end thereof may be coupled to, for example, the second end of the power feeding coil 131, while the second end thereof may be coupled to the second output terminal of the power transmission driver 12.

The communication unit 14 may perform communication with the power receiving device 20 (described later) of the electronic apparatus 90, and receive a feeding control signal CTL. This feeding control signal CTL may contain information necessary for power feeding operation, such as a request of the power feeding device 10 for an increase or a decrease in the feeding power. The communication unit 14 may acquire the feeding control signal CTL, on the basis of a voltage across both ends of the power feeding coil 131 and a current detected by the current detector 16. Specifically, to begin with, the power feeding device 10 may perform the power feeding into the power receiving device 20. During a period of the power feeding, a communication unit 24 (described later) of the power receiving device 20 may change a load, depending on a signal to be transmitted (feeding control signal CTL). Such a change in the load may appear, in the power feeding device 10, in a form of variations in amplitude and phase of the voltage across both ends of the power feeding coil 131, and variations in amplitude and phase of the current flowing through the power feeding coil 131. The communication unit 14 may acquire the feeding control signal CTL transmitted from the power receiving device 20 by detecting such variations in the amplitude and phase. In such a manner, in the feed system 1, communication may be performed through the so-called load modulation.

It is to be noted that, in this example, the communication unit 14 may receive the feeding control signal CTL; however, this is non-limiting. Any other signal may be received in addition to the feeding control signal CTL. Moreover, the communication unit 14 may further have a function of transmitting a signal to the power receiving device 20.

The controller 15 may control the transmission driver 12, on the basis of the feeding control signal CTL, and control the feeding power supplied to the power receiving device 20 of the electronic apparatus 90. At this time, the controller 15 may control the feeding power by controlling the feeding frequency fp of the power signal Sp1 generated by the power transmission driver 12 to change feeding efficiency from the power feeding device 10 to the power receiving device 20.

FIG. 3 illustrates an example of a configuration of the electronic apparatus 90. The electronic apparatus 90 may include the power receiving device 20 and a load 30. The power receiving device 20 may include the power receiving coil 211, a capacitor 212, a rectifier circuit 22, a feeding controller 23, the communication unit 24, a regulator 25, a current limiter 26, a current detector 28, and a controller 29.

The power receiving coil 211 may establish coupling to the power feeding coil 131 of the power feeding device 10 through the electromagnetic field. A first end of the power receiving coil 211 may be coupled to a first input terminal of the rectifier circuit 22 through the capacitor 212, and a second end thereof may be coupled to a second input terminal of the rectifier circuit 22. In such a manner, the power receiving coil 211 and the capacitor 212 may be coupled in series to form the LC resonance circuit. Thus, on the basis of the electromagnetic field generated by the power feeding coil 131 of the power feeding device 10, the power receiving coil 211 may generate an induced voltage in response to a change in magnetic flux, in accordance with a law of electromagnetic induction.

The circuit configured of the power receiving coil 211 and the capacitor 212 may generate an AC power signal Sp2 having a voltage in accordance with an induced voltage across both ends of the power receiving coil 211, and supply the generated signal to the rectifier circuit 22. In other words, the power signal Sp2 may be generated on the basis of the power signal Sp1 in the power feeding device 10.

The rectifier circuit 22 may rectify the AC power signal Sp2 to generate a DC signal (power receiving voltage Vrect), and may be a bridge-type full-wave rectifier circuit. The rectifier circuit 22 may include diodes 221 to 224 and a capacitor 225. An anode of the diode 221 may be coupled to the first input terminal of the rectifier circuit 22, and a cathode thereof may be coupled to a first output terminal of the rectifier circuit 22. An anode of the diode 222 may be coupled to a second output terminal of the rectifier circuit 22, and a cathode thereof may be coupled to the first input terminal of the rectifier circuit 22. An anode of the diode 223 may be coupled to the second input terminal of the rectifier circuit 22, and a cathode thereof may be coupled to the first output terminal of the rectifier circuit 22. An anode of the diode 224 may be coupled to the second output terminal, and a cathode thereof may be coupled to the second input terminal. A first end of the capacitor 225 may be coupled to the first output terminal of the rectifier circuit 22, and a second end thereof may be coupled to the second output terminal of the rectifier circuit 22. The second output terminal of the rectifier circuit 22 may be grounded. With this configuration, a rectified and smoothed DC signal (power receiving voltage Vrect) may be generated at the first output terminal of the rectifier circuit 22. This power receiving voltage Vrect may be also used as a supply voltage for each block of the power receiving device 20.

It is to be noted that, in this example, the rectifier circuit 22 is configured using the diodes 221 to 224 and the capacitor 225; however, this is non-limiting. A variety of rectifier circuits may be applicable.

The feeding controller 23 may generate the feeding control signal CTL, on the basis of the power receiving voltage Vrect. Specifically, for example, the feeding controller 23 may generate the feeding control signal CTL indicating the request for the increase in the feeding power when the power receiving voltage Vrect is low, and may generate the feeding control signal CTL indicating the request for the decrease in the feeding power when the power receiving voltage Vrect is high.

The communication unit 24 may transmit the feeding control signal CTL to the power feeding device 10. Specifically, the communication unit 24 may transmit the feeding control signal CTL to the power feeding device 10 through the so-called load modulation. In other words, during a period when the power feeding device 10 is performing the power feeding into the power receiving device 20, the communication unit 24 may change impedance between the first input terminal and the second input terminal of the rectifier circuit 22, depending on the feeding control signal CTL. The communication unit 14 of the power feeding device 10 may receive the feeding control signal CTL by detecting the change in the impedance (change in the load).

With this configuration, in the power receiving device 20, the feeding controller 23 may generate the feeding control signal CTL, on the basis of the power receiving voltage Vrect, and the communication unit 24 may transmit the feeding control signal CTL to the power feeding device 10 through the load modulation. As a result, the feeding controller 23 may request the power feeding device 10, for example, to increase or decrease the feeding power, through the feeding control signal CTL, and perform a control to allow the power receiving voltage Vrect to fall within a predetermined voltage range (Vtarget to Vtarget+ΔV) that may be a target voltage Vtarget or more.

The regulator 25 may generate DC power having a voltage Vreg, on the basis of the DC signal supplied from the rectifier circuit 22. Also, the regulator 25 may feed power into the load 30 through the current limiter 26 and the current detector 28.

The current limiter 26 may limit a current outputted from the regulator 25 (output current Iout of the power receiving device 20), on the basis of a control signal CLIM.

FIG. 4 illustrates current limiting characteristics of the current limiter 26. A horizontal axis denotes the output current Iout, and a vertical axis denotes an output voltage of the current limiter 26 (output voltage Vout of the power receiving device 20). The current limiter 26 is configured to allow for achievement of four current limiting characteristics W1 to W4, on the basis of the control signal CLIM. Each of these current limiting characteristics W1 to W4 may be represented with impedance of the load 30 as seen from the power receiving device 20 (load impedance ZL) serving as a parameter. As indicated in the current limiting characteristics W1 to W4, when the load impedance ZL is large (when the load is small), the current limiter 26 may output the constant voltage Vreg irrespective of the output current Iout. In other words, in this case, the current limiter 26 may perform constant-voltage operation. Thereafter, when the load impedance ZL gets smaller, and the output current Iout reaches a current-limiting value Ilim, the output voltage Vout may drop from the voltage Vreg with the output current Iout maintained. More specifically, in this case, the output current Iout may be limited to the current-limiting value Ilim, and the current limiter 26 may performs constant-current operation. In these four current limiting characteristics W1 to W4, the current-limiting value Ilim may be set at different values Ith [1] to Ith [4], respectively. Here, each of the values Ith [1] to Ith [4] may be set at, for example, about several hundred [mA].

The current limiter 26 may supply the DC power generated by the regulator 25 to the load 30 while limiting the output current Iout in such a manner. In other words, the power receiving device 20 may supply the load 30 with output power Pout represented by a product of the output voltage Vout and the limited output current Iout.

The current detector 28 may detect the output current Iout, and a first end thereof may be coupled to an output terminal of the current limiter 26, while a second end thereof may be coupled to an input terminal of the load 30.

It is to be noted that, in this example, the current detector 28 may be provided behind the current limiter 26; however, this is non-limiting. Alternatively, for example, the current detector 28 may be provided between the regulator 25 and the current limiter 26. Further, in this example, the regulator 25, the current limiter 26, and the current detector 28 may be configured as separate blocks; however, this is non-limiting. Alternatively, for example, two or all of these three blocks may be configured as a single block.

The controller 29 may select one of the current limiting characteristics W1 to W4, on the basis of the power receiving voltage Vrect and the output current Iout, and perform a control to allow the current limiter 26 to operate with the selected current limiting characteristic through the control signal CLIM. The controller 29 may be configured using, for example, an MCU (Micro-Controller Unit).

The load 30 may include a charge controller 31, a secondary battery 32, and an electronic circuit 33. The charge controller 31 may control charging operation in the secondary battery 32. The secondary battery 32 may store DC power, and may be configured using a rechargeable battery such as a lithium-ion battery. The electronic circuit 33 may receive power supplied from the secondary battery 32 to perform processing that may achieve a function of the electronic apparatus 90.

With this configuration, in the power receiving device 20, as described later, for example, when charging of the secondary battery 32 is started, or the electronic circuit 33 starts processing that involves large amounts of calculation, the current limiter 26 and the controller 29 may relax the current-limiting value Ilim in a step-by-step manner. This allows the power receiving device 20 to reduce possibility that the power feeding operation becomes unstable.

Here, the power receiving coil 211, the capacitor 212, the rectifier circuit 22, the regulator 25, and the current limiter 26 correspond to a specific but non-limitative example of a "power generating unit" in one embodiment of the present disclosure. The current detector 28 and the controller 29 correspond to a specific but non-limitative example of a "control unit" in one embodiment of the present disclosure. The feeding controller 23 and the communication unit 24 correspond to a specific but non-limitative example of a "communication unit" in one embodiment of the present disclosure.

[Operation and Workings]

Next, description is provided on operation and workings of the feed system 1 according to the present embodiment.

(Overview of Overall Operation)

First, an overview of overall operation of the feed system 1 is described with reference to the figures including FIGS. 2 and 3. In the power feeding device 10, the AC/DC converter 11 may convert the AC power supply signal supplied from the AC power supply 9 into the DC power supply signal, and supply the resulting signal to the power transmission driver 12. The power transmission driver 12 may generate the AC power signal Sp1 having the square waveform, on the basis of the DC power supply signal supplied from the AC/DC converter 11, and supply the power signal Sp1 to the power feeding coil 131. The power feeding coil 131 may generate the electromagnetic field, on the basis of the power signal Sp1. The current detector 16 may detect the current flowing through the power feeding coil 131. The communication unit 14 may receive the feeding control signal CTL from the power receiving device 20. The controller 15 may control the power transmission driver 12, on the basis of the feeding control signal CTL, and control the feeding power to be supplied to the power receiving device 20.

In the power receiving device 20, the power receiving coil 211 may generate the induced voltage, in response to the change in the magnetic flux, on the basis of the electromagnetic field generated by the power feeding coil 131. Thereafter, the power receiving coil 211 and the capacitor 212 may supply the power signal Sp2 corresponding to the power signal Sp1 to the rectifier circuit 22. The rectifier circuit 22 may rectify the power signal Sp2 to generate the DC signal having the power receiving voltage Vrect. Thereafter, the rectifier circuit 22 may supply this power receiving voltage Vrect as the supply voltage to each block of the power receiving device 20. The feeding controller 23 may generate the feeding control signal CTL, on the basis of the power receiving voltage Vrect. The communication unit 24 may transmit the feeding control signal CTL to the power feeding device 10. The regulator 25 may generate the DC power, on the basis of the DC signal supplied from the rectifier circuit 22. The current limiter 26 may limit the current outputted from the regulator 25 (output current Tout of the power receiving device 20), on the basis of the control signal CLIM. The current detector 28 may detect the output current Tout. The controller 29 may select one of the current limiting characteristics W1 to W4, on the basis of the power receiving voltage Vrect and the output current Tout, and control the current limiter 26 through the control signal CLIM.

In the load 30, the charge controller 31 may controls the charging operation in the secondary battery 32. The secondary battery 32 may store the DC power. The electronic circuit 33 may receive the power supplied from the secondary battery 32 to perform the processing that may achieve the function of the electronic apparatus 90.

(Detailed Operation)

The power receiving device 20 may receive the power supplied from the power feeding device 10, and supply the power to the load 30. At this time, for example, when the charging of the secondary battery 32 is started, or the electronic circuit 33 starts the processing that involves large amounts of calculation, the power receiving device 20 may relax the current-limiting value Ilim in the step-by-step manner in accordance with the output current Iout. In the following, operation of the power receiving device 20 is described by taking examples of a case where the output current Iout increases rapidly and a case where the output current Iout increases slowly.

FIG. 5 is a timing chart of the power receiving device 20 in the case where the output current Iout increases rapidly. In this example, a current In necessary for the load 30 may be larger than the value Ith [3], and may be smaller than the value Ith [4]. In an initial state, the current-limiting value Ilim may be set at the value Ith [1]. It is to be noted that, in this example, a value Ith [0] may be also defined in addition to the values Ith [1] to Ith [4]. The value Ith [0] may be set at "0" (zero) in this example.

First, at timing t1, the load 30 may start to operate, and the output current Iout may increase rapidly. At this time, the current-limiting value Ilim may be set at the value Ith [1] in the current limiter 26, and therefore, the output current Iout may be limited to the value Ith [1]. With the increase in the output current Iout, the power receiving voltage Vrect may temporarily drop from the target voltage Vtarget. Thereafter, during a predetermined period P1 from the timing t1, the feeding controller 23 may request the power feeding device 10 to increase the feeding current. This causes the power receiving voltage Vrect to increase gradually to reach the target voltage Vtarget.

During a period of timing t1 to t2, the controller 29 may confirm whether or not a state where the output current Iout is larger than the value Ith [0] (Iout>Ith [0]), and the power receiving voltage Vrect is larger than the target voltage Vtarget (Vrect>Vtarget) has continued for a certain period of time or longer. In this example, during a period from time when the power receiving voltage Vrect reaches the target voltage Vtarget until the timing t2, the state of "Iout>Ith [0]" and "Vrect>Vtarget" may continue. In other words, these conditions may be satisfied at the timing t2. Thereafter, after the controller 29 confirms that these conditions are satisfied, the controller 29 may relax the current-limiting value Ilim by one step as described below. Specifically, the controller 29 may determine that the current In necessary for the load 30 is larger than the value Ith [1] when the conditions are satisfied, and relax the current-limiting value Ilim by one step.

Next, at the timing t2, the controller 29 may relax the current-limiting value Ilim by one step, and set the current-limiting value Ilim at the value Ith [2]. As a result, the output current Iout may be limited to the value Ith [2] in the current limiter 26. At the same time, the power receiving voltage Vrect may temporarily drop from the target voltage Vtarget, and reach the target voltage Vtarget again after elapse of a predetermined period P2.

During a period of timing t2 to t3, the controller 29 may confirm whether or not a state where the output current Iout is larger than the value Ith [1] (Iout>Ith [1]), and the power receiving voltage Vrect is larger than the target voltage Vtarget (Vrect>Vtarget) has continued for a certain period of time or longer. In this example, these conditions may be satisfied at the timing t3.

Next, at the timing t3, the controller 29 may relax the current-limiting value Ilim by one step, and set the current-limiting value Ilim at the value Ith [3]. As a result, the output current Iout may be limited to the value Ith [3] in the current limiter 26. At the same time, the power receiving voltage Vrect may temporarily drop from the target voltage Vtarget, and reach the target voltage Vtarget again after elapse of a predetermined period P3.

During a period of timing t3 to t4, the controller 29 may confirm whether or not a state where the output current Iout is larger than the value Ith [2] (Iout>Ith [2]), and the power receiving voltage Vrect is larger than the target voltage Vtarget (Vrect>Vtarget) has continued for a certain period of time or longer. In this example, these conditions may be satisfied at the timing t4.

Next, at the timing t4, the controller 29 may relax the current-limiting value Ilim by one step, and set the current-limiting value Ilim at the value Ith [4]. As a result, the output current Iout may be limited to the value Ith [4] in the current limiter 26. At the same time, the power receiving voltage Vrect may temporarily drop from the target voltage Vtarget, and reach the target voltage Vtarget again after elapse of a predetermined period P4.

In this example, the current In necessary for the load 30 may be larger than the value Ith [3], and may be smaller than the value Ith [4]. In other words, it is possible for the power receiving device 20 to supply a necessary current to the load 30 at and after the timing t4.

As described above, in the power receiving device 20, the current-limiting value Ilim may be relaxed in the step-by-step manner when the power feeding to the load 30 is started. As a result, even when the load 30 starts to operate, and the output current Iout increases rapidly, it is possible to restrain variation in the power receiving voltage Vrect, making it possible to reduce the possibility that the power feeding operation becomes unstable, unlike a power receiving device 20R (described later) according to a comparative example.

FIG. 6 is a timing chart of the power receiving device 20 in the case where the output current Iout increases slowly. In this example, because the current necessary for the load 30 increases slowly, the power receiving voltage Vrect may be maintained at the target voltage Vtarget. In other words, in this case, it is possible to compensate for lowering of the power receiving voltage Vrect that is caused by the increase in the output current Iout in such a manner that the feeding controller 23 requests the power feeding device 10 to increase the feeding power. This allows the power receiving voltage Vrect to be maintained at the target voltage Vtarget.

At timing t11, the controller 29 may relax the current-limiting value Ilim by one step, and set the current-limiting value Ilim at the value Ith [3]. Thereafter, during a period of timing t11 to t13, the controller 29 may confirm whether or not a state where the output current Iout is larger than the value Ith [2] (Iout>Ith [2]), and the power receiving voltage Vrect is larger than the target voltage Vtarget (Vrect>Vtarget) has continued for a certain period of time or longer. In this example, during a period of timing t12 to t13, a state of "Iout>Ith [2]" and "Vrect>Vtarget" may continue. In other words, these conditions may be satisfied at the timing t13. Thereafter, after the controller 29 confirms that these conditions are satisfied, the controller 29 may relax the current-limiting value Ilim by one step at the timing t13.

In such a manner, in the power receiving device 20, when the output current Iout increases slowly, the current-limiting value Ilim may be relaxed before the output current Iout reaches the current-limiting value Ilim. This allows the power receiving device 20 to supply the necessary current to the load 30.

FIG. 7 is a flowchart of power feeding operation in the feed system 1. The power feeding device 10 may performs the power feeding into the power receiving device 20, and the feeding power may be regulated through communication performed between the power feeding device 10 and the power receiving device 20. Also, in parallel with this operation, in the power receiving device 20, the controller 29 may sets the current-limiting value Ilim, on the basis of the power receiving voltage Vrect and the output current Iout. In the following, detailed description is given.

For example, when a user places the electronic apparatus 90 on the power feeding surface S1 of the power feeding device 10, to begin with, the power feeding device 10 may start the power feeding into the power receiving device 20 of the electronic apparatus 90 (step S1).

Next, the power receiving device 20 may boot up, on the basis of the power supplied from the power feeding device 10 (step S2). Specifically, in the power receiving device 20, the power receiving voltage Vrect may be generated by receiving the power fed from the power feeding device 10, and each block of the power receiving device 20 may start to operate using the power receiving voltage Vrect as the supply voltage. Then, after this, the feeding controller 23 may request the power feeding device 10, for example, to increase or decrease the feeding power, and perform the control to allow the power receiving voltage Vrect to fall within the predetermined voltage range that may be the target voltage Vtarget or more.

Thereafter, the controller 29 of the power receiving device 20 may set a variable N at "0" (zero) (step S3).

Thereafter, the controller 29 may increment the variable N (N=N+1) (step S4). Thereafter, when the variable N is larger than 4 (N>4), the controller 29 may set the variable N at "4" (step S5).

Thereafter, the controller 29 may set the current-limiting value Ilim at a value Ith [N] (step S6).

Thereafter, the controller 29 may acquire the power receiving voltage Vrect and the output current Iout (step S7).

Thereafter, the controller 29 may confirm whether or not a state where the output current Iout is larger than a value Ith [N−1] (Iout>Ith [N−1]), and the power receiving voltage Vrect is larger than the target voltage Vtarget (Vrect>Vtarget) has continued for a certain period of time or longer (step S8).

When the state of "Iout>Ith [N−1]" and "Vrect>Vtarget" continues for the certain period of time or longer ("Y" in step S8), the flow may return to step S4, and the controller 29 may increment the variable N to reset the current-limiting value Ilim (steps S4 to S6). In other words, the controller 29 may determine that the current necessary for the load 30 is larger than the value Ith [N] when the conditions are satisfied, and relax the current-limiting value Ilim by one step.

Meanwhile, when the state of "Iout>Ith [N−1]" and "Vrect>Vtarget" does not continue for the certain period of time or longer ("N" in step S8), the flow may proceed to step S9.

Next, the controller 29 may confirm whether or not a state where the variable N is 2 or more (N≥2), and the output current Iout is smaller than a value Ith [N−2] (Iout<Ith [N−2]) has continued for a certain period of time or longer (step S9).

When the state of "N≥2" and "Iout<Ith [N−2]" continues for the certain period of time or longer ("Y" in step S9), the controller 29 may decrement the variable N (N=N−1) (step S10), and the flow may return to the step S6, in which the controller 29 may reset the current-limiting value Ilim. In other words, the controller 29 may determine that the current necessary for the load 30 is smaller than the value Ith [N] when the conditions are satisfied, and may lower the current-limiting value Ilim by one step.

Meanwhile, when the state of "N≥2" and "Iout<Ith [N−2]" does not continue for the certain period of time or longer ("N" in step S9), the flow may return to step S7, in which the controller 29 may acquire the power receiving voltage Vrect and the output current Iout. The flow may repeat this loop until the conditions of step S8 or step S9 are satisfied.

Comparative Example

Next, description is provided on a power receiving device 20R according to a comparative example. The power receiving device 20R is configured to impose no limitation on the current outputted from the regulator 25 (output current Iout of the power receiving device 20R).

FIG. 8 illustrates an example of a configuration of an electronic apparatus 90R including the power receiving device 20R according to the comparative example. The power receiving device 20R may include the power receiving coil 211, the capacitor 212, the rectifier circuit 22, the feeding controller 23, the communication unit 24, and the regulator 25. In other words, the power receiving device 20R may be equivalent to a power receiving device in which the current limiter 26, the current detector 28, and the controller 29 are eliminated from the power receiving device 20.

FIG. 9 is a timing chart of the power receiving device 20R in the case where the output current Iout increases rapidly. In this example, at timing t21, the load 30 may start to operate, and the output current Iout may increase rapidly. With the increase in the output current Iout, the power receiving voltage Vrect may fall significantly from the target voltage Vtarget. Thereafter, in this example, during a predetermined period PR from timing t22, the feeding controller 23 may request the power feeding device 10 to increase the feeding power. This causes the power receiving voltage Vrect to increase gradually to reach the target voltage Vtarget.

In such a manner, in the power receiving device 20R according to the comparative example, with the increase in the output current Iout, the power receiving voltage Vrect may fall significantly from the target voltage Vtarget. Each block of the power receiving device 20R may operate using the power receiving voltage Vrect as the supply voltage. The power receiving device 20R may, therefore, possibly fail to operate normally due to the decrease in the power receiving voltage Vrect.

Further, when the target voltage Vtarget is set at a high value beforehand to avoid such operational instability, the power receiving device 20 may exhibit greater energy loss. Additionally, in this case, it is necessary to configure the power receiving device 20R using components with high withstand voltage, which could raise possibility of an increase in costs and component size. Also, for a power feeding device that supplies power to the power receiving device 20R, higher power feeding capability may be desired in order to raise the power receiving voltage Vrect in the power receiving device 20R.

In contrast, the power receiving device 20 according to the present embodiment may be provided with the current limiter 26 that may relax the current-limiting value Ilim in the step-by-step manner. Consequently, as illustrated in FIG. 5, when the output current Iout increases rapidly, it is possible to reduce an amount of drop of the power receiving voltage Vrect, which allows for reduction in possibility that the power feeding operation becomes unstable. Further, as compared with the power receiving device 20R according to the comparative example, the target voltage Vtarget is allowed to be set at a lower value. Hence, it is possible to suppress energy loss, to use components with lower withstand voltage, and to lower the power feeding capability desired for the power feeding device 10.

Moreover, in the power receiving device 20, the current-limiting value Ilim may be relaxed after confirming that the power receiving voltage Vrect becomes equal to or higher than the target voltage Vtarget. Hence, it is possible to reduce the possibility that the power feeding operation becomes unstable. In other words, for example, when the current-limiting value Ilim is relaxed in a state in which the power receiving voltage Vrect is low, the power receiving voltage Vrect may be further decreased, which may lead to the possibility that the power feeding operation becomes unstable. In contrast, in the power receiving device 20, the current-limiting value Ilim may be relaxed after confirming that the power receiving voltage Vrect becomes equal to or higher than the target voltage Vtarget. Hence, it is possible to maintain the power receiving voltage Vrect at a high value, thereby allowing for reduction in the possibility that the power feeding operation becomes unstable.

Effects

As described thus far, in the present embodiment, a current limiter may be provided, and a current-limiting value may be relaxed in a step-by-step manner. Consequently, when an output current increases rapidly, it is possible to reduce possibility that power feeding operation becomes unstable. Further, a target voltage is allowed to be set at a low value. Hence, it is possible to suppress energy loss, to use components with lower withstand voltage, and to lower power feeding capability desired for a power feeding device.

In the present embodiment, the current-limiting value may be relaxed after confirming that a power receiving voltage becomes equal to or higher than the target voltage. Hence, it is possible to reduce the possibility that the power feeding operation becomes unstable.

Modification Example 1

In the above-described embodiment, the controller 29 may select one of the current limiting characteristics W1 to W4, on the basis of the power receiving voltage Vrect and the output current Iout; however, this is non-limiting. In the following, a power receiving device 20A according to this modification example is described in detail.

FIG. 10 illustrates an example of a configuration of an electronic apparatus 90A including the power receiving device 20A. The power receiving device 20A may include a controller 29A. The controller 29A may select one of the current limiting characteristics W1 to W4, on the basis of the output current Iout, and control the current limiter 26 to operate with the selected current limiting characteristic through the control signal CLIM. At this time, after the controller 29A changes the current-limiting value Ilim, the controller 29A may wait for elapse of convergence time of the power receiving voltage Vrect (elapse of each of the time periods P1 to P4 in FIG. 5), and thereafter acquire the output current Iout. In other words, the controller 29 according to the above-described embodiment may confirm that the power receiving voltage Vrect becomes equal to or higher than the target voltage Vtarget; in contrast, the controller 29A according to this modification example may perform processing at time when the power receiving voltage Vrect reaches the target voltage Vtarget.

FIG. 11 is a flowchart of power feeding operation in a feed system 1A using the electronic apparatus 90A.

As with the feed system 1, in the feed system 1A, to begin with, the power feeding device 10 may start the power feeding into the power receiving device 20A of the electronic apparatus 90A (step S1), and the power receiving device 20A may boot up (step S2). Thereafter, the controller 29A of the power receiving device 20A may set the variable N at "0" (zero) (step S3). Thereafter, the controller 29A may increment the variable N (N=N+1) (step S4), and when the variable N is larger than 4 (N>4), the controller 29A may set the variable N at "4" (step S5). Thereafter, the controller 29A may set the current-limiting value Ilim at the value Ith [N] (step S6).

Next, the controller 29A may wait for elapse of predetermined time (step S11). This predetermined time may correspond to the convergence time of the power receiving voltage Vrect (each of the time periods P1 to P4 in FIG. 5). Thereafter, the controller 29A may acquire the output current Iout (step S12).

Thereafter, the controller 29A may confirm whether or not the state where the output current Iout is larger than the value Ith [N−1] (Iout>Ith [N−1]) has continued for a certain period of time or longer (step S13). When the state of "Iout>Ith [N−1]" continues for the certain period of time or longer ("Y" in step S13), the flow may return to step S4, and the current-limiting value Ilim may be relaxed by one step. Meanwhile, when the state of "Iout>Ith [N−1]" does not continue for the certain period of time or longer ("N" in step S13), the flow may proceed to step S9.

Subsequent operation may be similar to that in the case of the feed system 1 (FIG. 7).

As described above, the controller 29A may not confirm that the power receiving voltage Vrect becomes equal to or higher than the target voltage Vtarget. Instead, the controller 29A may wait until time when the power receiving voltage Vrect becomes equal to or higher than the target voltage Vtarget. With such a configuration, it is also possible to attain similar effects to those of the feed system 1 according to the above-described embodiment.

Modification Example 2

In the above-described embodiment, in the current limiter 26, as illustrated in FIG. 4, the load impedance ZL may be made smaller. After the output current Iout reaches the current-limiting value Ilim, the output voltage Vout may drop with the current maintained. This, however, is non-limiting. For example, like a current limiter 26B illustrated in FIG. 12A, the output voltage Vout may drop with an increase in the output current Iout. Alternatively, like a current limiter 26C illustrated in FIG. 12B, the output voltage Vout may drop with a decrease in the output current Iout.

Modification Example 3

Further, for example, the current limiter 26 may have a function to shut off the power feeding into the load 30 when the output voltage Vout becomes equal to or lower than a predetermined value.

Modification Example 4

In the above-described embodiment, in the current limiter 26, as illustrated in FIG. 4, the load impedance ZL may be made smaller. After the output current Iout reaches the current-limiting value Ilim, the constant-current operation may be performed. This, however, is non-limiting. In the following, a power receiving device 20D according to this modification example is described in detail.

FIG. 13 illustrates a configuration example of an electronic apparatus 90D including the power receiving device 20D. The power receiving device 20D may include a power limiter 26D and a controller 29D.

The power limiter 26D may limit power outputted from the regulator 25 (output power Pout of the power receiving device 20D), on the basis of the control signal CLIM.

FIG. 14 illustrates power limiting characteristics of the power limiter 26D. When the load impedance ZL is large (when the load is small), the power limiter 26D may output the constant voltage Vreg irrespective of the output current Iout. In other words, in this case, the power limiter 26D may perform the constant-voltage operation. Meanwhile, when the load impedance ZL gets smaller, and the output power Pout reaches a power-limiting value Plim (values Pth [1] to Pth [4]), the output voltage Vout may drop with the output power Pout maintained. More specifically, in this case, the output power Pout may be limited to the power-limiting value Plim, and the power limiter 26D may perform the constant-power operation.

The controller 29D may select one of a plurality of power limiting characteristics, on the basis of the power receiving voltage Vrect, the output current Iout, and the output voltage Vout, and control the power limiter 26D to operate with the selected power limiting characteristic through the control signal CLIM.

FIG. 15 is a flowchart of power feeding operation in a feed system 1D using the electronic apparatus 90D.

As with the feed system 1, in the feed system 1D, to begin with, the power feeding device 10 may start the power feeding into the power receiving device 20D (step S1), and the power receiving device 20D may boot up (step S2). Thereafter, the controller 29D may set the variable N at "0" (zero) (step S3). Thereafter, the controller 29D may increment the variable N (N=N+1) (step S4), and when the variable N is larger than 4 (N>4), the controller 29D may set the variable N at "4" (step S5).

Thereafter, the controller 29D may set the power-limiting value Plim at a value Pth [N] (step S21).

Next, the controller 29D may acquire the power receiving voltage Vrect and the output power Pout (step S22). At this time, the controller 29D may acquire the output power Pout, on the basis of the output voltage Vout and the output current Iout.

Thereafter, the controller 29D may confirm whether or not a state where the output power Pout is larger than a value Pth [N−1] (Pout>Pth [N−1]), and the power receiving voltage Vrect is larger than the target voltage Vtarget (Vrect>Vtarget) has continued for a certain period of time or longer (step S23). When the state of "Pout>Pth [N−1]" and "Vrect>Vtarget" continues for the certain period of time or longer ("Y" in step S23), the flow may return to step S4, and the controller 29D may relax the power-limiting value Plim by one step. Meanwhile, when the state of "Pout>Pth [N−1]" and "Vrect>Vtarget" does not continue for the certain period of time or longer ("N" in step S23), the flow may proceed to step S24.

Next, the controller 29D may confirm whether or not a state where the variable N is 2 or more (N≥2), and the output power Pout is smaller than a value Pth [N−2] (Pout<Pth [N−2]) has continued for a certain period of time or longer (step S24). When the state of "N≥2" and "Pout<Pth [N−2]" continues for the certain period of time or longer ("Y" in step S24), the controller 29D may decrement the variable N (N=N−1) (step S10), and the flow may return to step S21, in which the controller 29D may lower the power-limiting value Plim. Meanwhile, when the state of "N≥2" and "Pout<Pth [N−2]" does not continue for the certain period of time or longer ("N" in step S24), the flow may return to step S22, in which the controller 29D may acquire the power receiving voltage Vrect and the output power Pout. The flow may repeat this loop until the conditions of step S23 or step S24 are satisfied.

As described above, the power receiving device 20D may be provided with the power limiter 26D that may relax the power-limiting value Plim in the step-by-step manner. With such a configuration, it is also possible to attain similar effects to those of the feed system 1 according to the above-described embodiment.

Modification Example 5

In the above-described embodiment, power may be supplied through the electromagnetic induction; however, this is non-limiting. Alternatively, for example, power may be supplied through electric field coupling. In the following, a feed system 2 according to this modification example is described in detail.

FIG. 16 illustrates an example of a configuration of the feed system 2. The feed system 2 may include a power feeding device 40 and an electronic apparatus 50 (a smartphone in this example). Two power feeding electrodes 41A and 41B (described later) may be disposed on a top surface (on side on which the power feeding device 40 may make contact with the electronic apparatus 50) of the power feeding device 40. Two power receiving electrodes 51A and 51B (described later) may be disposed on a bottom surface (on side on which the electronic apparatus 50 may make contact with the power feeding device 40) of the electronic apparatus 50. The power feeding device 40 may perform the power feeding into the power receiving device 60 (described later) of the electronic apparatus 50 through the electric field coupling with use of these electrodes.

FIG. 17 illustrates a simplified cross-sectional view of the power feeding device 40 and the electronic apparatus 50. This example illustrates a state where the power feeding operation may be performed with the electronic apparatus 50 placed on the power feeding device 40.

The power feeding device 40 may include the two power feeding electrodes 41A and 41B. The power feeding electrodes 41A and 41B may be disposed on a surface that may be in contact with the electronic apparatus 50 (power feeding surface S1). Each of these power feeding electrodes 41A and 41B may be covered by an insulator 8. This allows the power feeding electrodes 41A and 41B to perform the electric field coupling to the respective power receiving electrodes 51A and 51B of the electronic apparatus 50 through the insulator 8, for example.

The electronic apparatus 50 may include the two power receiving electrodes 51A and 51B. The power receiving electrodes 51A and 51B may be disposed on a surface that may be in contact with the power feeding device 40 (power receiving surface S2). The power receiving electrode 51A may be disposed at a position corresponding to the power feeding electrode 41A of the power feeding device 40. The power receiving electrode 51B may be disposed at a position corresponding to the power feeding electrode 41B of the power feeding device 40. Each of these power receiving electrodes 51A and 51B may be covered by an insulator 9. This allows the power receiving electrodes 51A and 51B to perform the electric field coupling to the respective power feeding electrodes 41A and 41B of the power feeding device 10 through the insulator 9, for example.

FIG. 18 illustrates an example of a configuration of the power feeding device 40. The power feeding device 40 may include the AC/DC converter 11, the power transmission driver 12, the communication unit 14, the controller 15, the current detector 16, and a coil 17. A first end of the coil 17 may be coupled to the first output terminal of the power transmission driver 12, and a second end thereof may be coupled to, for example, the power feeding electrode 41A. The power feeding electrode 41A may be coupled to the first output terminal of the power transmission driver 12 through the coil 17, and the power feeding electrode 41B may be coupled to the second output terminal of the power transmission driver 12 through the current detector 16.

FIG. 19 illustrates an example of a configuration of the electronic apparatus 50. The electronic apparatus 50 may include a power receiving device 60 and the load 30. As with the power receiving device 20 according to the above-described embodiment, the power receiving device 60 may include the rectifier circuit 22, the feeding controller 23, the communication unit 24, the regulator 25, the current limiter 26, the current detector 28, and the controller 29. The power receiving electrode 51A may be coupled to the first input terminal of the rectifier circuit 22, and the power receiving electrode 51B may be coupled to the second input terminal of the rectifier circuit 22.

With this configuration, it is also possible to attain similar effects to those of the feed system 1 according to the above-described embodiment.

Other Modification Examples

Further, combination of two or more of the above-described modification examples may be permitted.

Although description has been made by giving the embodiments and modification examples as mentioned above, the contents of the disclosure are not limited to the above-mentioned embodiments and examples, and may be modified in a variety of ways.

For example, in the above-described embodiments and examples, the power receiving device 20 may transmit the feeding control signal CTL to the power feeding device 10 through the load modulation; however, this is non-limiting. Alternatively, the feeding control signal CTL may be transmitted through, for example, Bluetooth or any other transmission method.

For example, in the above-described embodiments and examples, the current controller 26 may have the four current limiting characteristics W1 to W4, as illustrated in FIG. 4; however, this is non-limiting. Alternatively, the current controller 26 may have, for example, three or less, or five or more current limiting characteristics.

Further, for example, in the above-described embodiments and examples, the current controller 26 and the controller 29 may set the current-limiting value Ilim in the step-by-step manner; however, this is non-limiting. Alternatively, for example, the current-limiting value Ilim may be set as continuous values.

It is to be noted that effects described herein are merely exemplified and not limitative, and effects of the disclosure may be other effects or may further include other effects.

It is to be noted that the present technology may have the following configurations.

(1) A power receiving device including:
a power generating unit that generates direct-current power, on a basis of a power signal supplied from a power feeding device wirelessly; and
a control unit that sets, on a basis of an output current of the power generating unit, an upper limit of the output current or an upper limit of output power of the power generating unit.

(2) The power receiving device according to (1), wherein
the power generating unit includes a rectifier circuit that rectifies the power signal, and
the control unit sets the upper limit, on a basis of an output voltage of the rectifier circuit in addition to the output current.

(3) The power receiving device according to (2), wherein the control unit sets the upper limit after elapse of predetermined time since the output voltage of the rectifier circuit becomes equal to or higher than a predetermined voltage.

(4) The power receiving device according to (1), wherein the control unit sets the upper limit after elapse of predetermined time since the upper limit is changed.

(5) The power receiving device according to any one of (1) to (4), wherein
an entire possible range of a current value of the output current is divided into a plurality of segmentation ranges, and
the control unit sets the upper limit, in accordance with the segmentation range that the current value of the output current belongs to.

(6) The power receiving device according to (5), wherein the control unit sets the upper limit after elapse of predetermined time since the segmentation range that the current value of the output current belongs to is changed.

(7) The power receiving device according to (5) or (6), wherein the larger the current value of the output current is, the larger the upper limit is.

(8) The power receiving device according to any one of (1) to (7), wherein the control unit sets the upper limit, on a basis of an output voltage of the power generating unit in addition to the output current.

(9) The power receiving device according to any one of (1) to (8), further including a communication unit that performs communication with the power feeding device to instruct the power feeding device to increase or decrease an amount of power feeding.

(10) The power receiving device according to any one of (1) to (9), wherein the power generating unit includes a coil that receives the power signal.

(11) The power receiving device according to any one of (1) to (9), wherein the power generating unit includes a power receiving electrode that receives the power signal.

(12) A method of controlling a power receiving device, the method including:
allowing a power generating unit to generate direct-current power, on a basis of a power signal supplied from a power feeding device wirelessly; and setting, on a basis of an output current of the power generating unit, an upper limit of the output current or an upper limit of output power of the power generating unit.

(13) A feed system including:
a power feeding device; and
a power receiving device,
the power receiving device including
a power generating unit that generates direct-current power, on a basis of a power signal supplied from a power feeding device wirelessly, and
a control unit that sets, on a basis of an output current of the power generating unit, an upper limit of the output current or an upper limit of output power of the power generating unit.

This application claims the benefit of Japanese Priority Patent Application JP 2014-076153 filed on Apr. 2, 2014, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A power receiving device comprising:
a control unit electrically connected directly to a power generating unit,
wherein the control unit is configured to:
receive, from the power generating unit, power that comprises an output current and an output voltage,
detect, after the control unit receives the power, an amount of the output current that is in the power,
control, after the control unit detects the amount of the output current, the power generating unit in a manner that causes the power generating unit to set the amount of the output current to a current-limiting value, and
control, after an elapse of a predetermined time since the output voltage becomes equal to or higher than a predetermined voltage, the power generating unit in a manner that causes the power generating unit to set the amount of the output current to the current-limiting value.

2. The power receiving device according to claim 1, further comprising:
a load electrically connected directly to the control unit,
wherein the load is configured to receive the output voltage from the control unit.

3. The power receiving device according to claim 1, further comprising:
a battery that stores the power.

4. The power receiving device according to claim 3, further comprising:
a charge controller that controls a charging operation of the battery.

5. The power receiving device according to claim 3, further comprising:
an electronic circuit that receives the power from the battery.

6. A power receiving device comprising:
a control unit electrically connected directly to a power generating unit,
wherein the control unit is configured to:
receive, from the power generating unit, power that comprises an output current and an output voltage,
detect, after the control unit receives the power, an amount of the output current that is in the power,
control, after the control unit detects the amount of the output current, the power generating unit in a manner that causes the power generating unit to set the amount of the output current to a current-limiting value, and
control, after an elapse of a time period since the control unit controls the power generating unit in a manner that sets the amount of the output current to another value, the power generating unit in a manner that causes the power generating unit to limit the amount of the output current to the current-limiting value.

7. The power receiving device according to claim 1, further comprising:
a communication unit electrically connected directly to the power generating unit,
wherein the communication unit is configured to:
receive, from the power generating unit, a voltage before the communication unit controls the power generating unit in a manner that causes the power generating unit to adjust the voltage that is output from the power generating unit.

8. The power receiving device according to claim 1, wherein the power generating unit configured to:
convert a signal into the power after the power receiving circuitry receives the signal wirelessly from a power feeding device.

9. A feed system comprising:
the power receiving device according to claim 8; and
the power feeding device.

10. A method of controlling a power receiving device, the method comprising:
receiving, from a power generating unit by a control unit that is electrically connected directly to the power generating unit, power comprising an output current and an output voltage;
detecting, by the control unit after the control unit receives the power, an amount of the output current that is in the power;
controlling, by the control unit after the control unit detects the amount of the output current, the power generating unit in a manner that causes the power generating unit to set the amount of the output current to a current-limiting value; and
receiving, from the power generating unit by a communication unit electrically connected directly to the power generating unit, a voltage before the communication unit controls the power generating unit in a manner that causes the power generating unit to adjust the voltage that is output from the power generating unit.

11. The method according to claim 10, further comprising:
receiving, by a load electrically connected directly to the control unit, the output voltage from the control unit.

12. The method according to claim 10, further comprising:
storing, by a battery, the power.

13. The method according to claim 12, further comprising:
controlling, by a charge controller, a charging operation in the battery.

14. The method according to claim 12, further comprising:
receiving, by an electronic circuit, the power from the battery.

15. The method according to claim 10, further comprising:
- controlling, by the control unit after an elapse of a predetermined time since the output voltage becomes equal to or higher than a predetermined voltage, the power generating unit in a manner that causes the power generating unit to set the amount of the output current to the current-limiting value.

16. The method according to claim 10, further comprising:
- controlling, by the control unit after an elapse of a time period since the control unit controls the power generating unit in a manner that sets the amount of the output current to another value, the power generating unit in a manner that causes the power generating unit to limit the amount of the output current to the current-limiting value.

17. The method according to claim 10, further comprising:
- converting, by the power generating unit, a signal into the power after the power receiving circuitry receives the signal wirelessly from a power feeding device.

* * * * *